United States Patent Office 2,983,209
Patented May 9, 1961

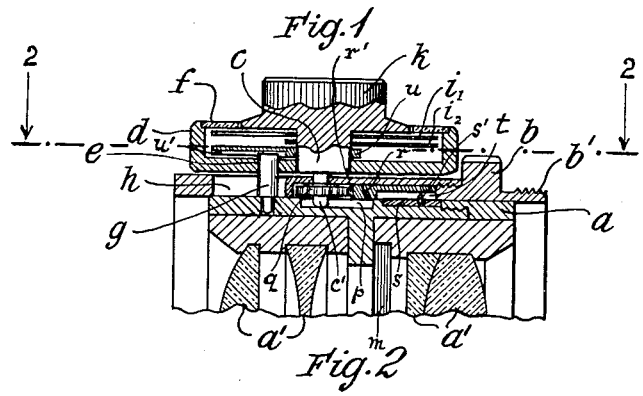
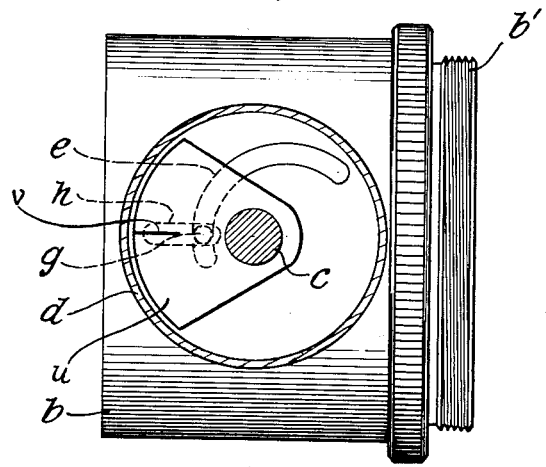
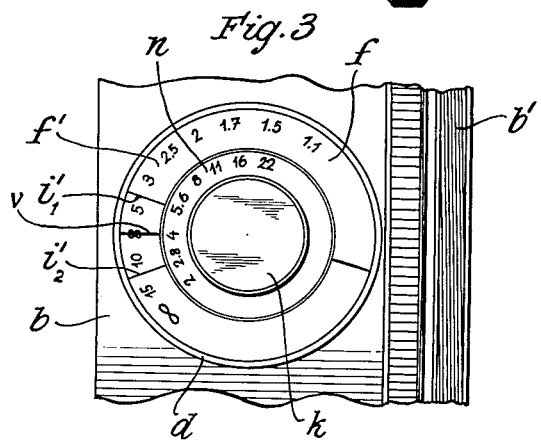

2,983,209

FOCUSING MECHANISM FOR PHOTOGRAPHIC OR CINEMATOGRAPHIC OBJECTIVE

Franz Werner, Munster-Sarmsheim, Rhineland, Germany, assignor to Jos. Schneider & Co., Optische Werke, Kreuznach, Rhineland, Germany, a corporation of Germany Filed July 27, 1959, Ser. No. 829,816

Claims priority, application Germany Aug. 12, 1958

3 Claims. (Cl. 95—45)

My present invention relates to an optical objective for photographic or cinematographic cameras in which the position of a lens carrier is adjustable for focusing purposes.

In the usual focusable camera provided with an axially displaceable lens barrel, the focusing mechanism includes a ring coaxially surrounding the lens barrel and threadedly engaging some portion thereof. This increases the overall dimensions of the objective to a not inconsiderable extent and, in addition, complicates the assembly since means must be provided for holding the focusing ring against axial displacement on the objective housing while permitting its rotation relative to the lens barrel.

The general object of my present invention is to provide a focusing mechanism of reduced bulk which is accurate in its operation and easily manipulated by the user.

A more particular object of this invention is to provide focusing means of this character at a location of the camera most convenient for operation and observation.

A further object of my invention is to provide, in combination with such focusing mechanism, diaphragm-setting means occupying the same location on the camera.

An important feature of my instant invention resides in the provision of a rotatable focusing member so mounted on a generally cylindrical objective housing that its axis of rotation extends radially of the housing and of the lens barrel axially displaceable therein, in combination with coupling means for translating a rotation of the focusing member into an axial movement of the lens barrel. The coupling means advantageously comprises a camming surface on the focusing member and a follower on the lens barrel whereby, pursuant to another object of the invention, the movement of the focusing member may be related to the advance of the lens barrel in accordance with any desired law to afford a convenient spacing of the markings of an associated distance scale. In a preferred embodiment, the focusing member is cup-shaped and has its bottom formed with an arcuate camming slot receiving a follower pin of the lens barrel, the cup-shaped member being adapted to accommodate in its interior a distance indicator as well as, if desired, a diaphragm-setting knob and associated indicating means.

The above and other objects, features and advantages of the present invention will become more fully apparent from the following detailed description, reference being made to the accompanying drawing in which:

Fig. 1 shows, in fragmentary axial section, a camera objective provided with a focusing mechanism according to the invention;

Fig. 2 is a top plan view of the objective, with the focusing mechanism shown in section on the line 2—2 of Fig. 1; and Fig. 3 is a top plan view of the focusing mechanism.

The objective shown in the drawing comprises a lens barrel $a$ which carries several lenses $a'$ and is axially slidable in a cylindrical housing $b$, the latter being provided with screw threads $b'$ for removably attaching it to a camera body not shown. Rotatably lodged in the housing $b$ is an axially extending shaft $c$ which is integral with a diaphragm-setting knob $k$ and has a reduced extension $c'$ playing in a longitudinal slot $p$ of lens barrel $a$. The latter, which is thus axially slidable but non-rotatable with respect to housing $b$, further carries an iris diaphragm $m$ whose aperture is adjustable, in a manner not further illustrated but well known per se, with the aid of a control ring $s$ rotatably lodged in a peripheral recess of barrel $a$. Another ring $r$, rotatably received in an internal peripheral recess of housing $b$, is provided with a longitudinal groove $t$ into which projects a pin $s'$ from ring $s$ whereby the two rings will rotate in unison throughout the range of operative axial displacement of the lens barrel. Ring $r$ is provided with gear teeth $r'$ which are engaged by a pinion $q$ keyed onto shaft extension $c'$. This arrangement translates any rotation on knob $k$ into a rotation of ring $s$ to adjust the aperture of iris diaphragm $m$ regardless of the relative axial position of lens barrel $a$ and housing $b$.

A stud $g$, projecting radially outwardly from lens barrel $a$, traverses a longitudinal slot $h$ in housing $b$ and enters an arcuate camming slot $e$ in the disk-like bottom of a cup-shaped focusing member $d$ which is freely rotatable about the shaft $c$. A sector-shaped indicator member $u$, also freely rotatable about shaft $c$, is provided at its underside with a radial groove $u'$ into which projects the stud $g$ to hold the sector $u$ in an angular position which is independent of that of knob $k$ or focusing member $d$. The upper surface of member $u$ carries a mark $v$ which is visible through a transparent scale carrier $f$, supported on the upper rim of member $d$, so as to co-operate with distance marking $f'$ on that carrier and also with a diaphragm scale $n$ carried on knob $k$.

It will be apparent that any rotary displacement of member $d$ will result in an axial movement of stud $g$ with respect to the optic axis and, with it, of lens barrel $a$ to focus the objective upon a distance read on the scale $f'$.

Within the interior of the cup-shaped member $d$ underlying the transparent scale carrier $f$, I have also shown two masking segments $i_1$, $i_2$ which serve as depth-of-field indicators by marking off portions of scale $f'$ with their edges $i_1'$, $i_2'$. These masking segments are controlled by the three relatively rotatable elements $d$, $k$ and $u$, via cams, gears or similar transmission (not shown) as is well known per se, to indicate the range of sharp focusing for any given setting of cup $d$ and knob $k$; reference in this connection may be made to co-pending application Ser. No. 621,492, filed November 8, 1956 by Karl H. Schütz, now Patent No. 2,916,980, issued December 15, 1959, in which there has been disclosed a similar system for obscuring the markings on a transparent scale with the aid of opaque masking members positioned behind the latter. The surface of sector $u$ may be brightly colored to form a contrasting background for the unobscured portion of the scale.

The invention is, of course, not limited to the specific embodiment described and illustrated but may be realized in various modifications and adaptations without departing from the spirit and scope of the appended claims.

I claim:

1. A camera objective comprising a generally cylindrical housing, a lens barrel axially displaceable in said housing, an adjustable diaphragm in said lens barrel, a rotatable shaft extending radially outwardly on said housing, a cup-shaped focusing member freely rotatable about said shaft, a diaphragm-setting member on said shaft within the outline of said cup-shaped focusing member, first coupling means operatively connecting said focusing member with said lens barrel for translating a rotation of the former into an axial displacement of the latter, second coupling means operatively connecting said diaphragm-setting member with said diaphragm, a light-transmissive scale carrier on said focusing member surrounding said diaphragm-setting member, first indicator means on said diaphragm-setting member co-operating with said scale carrier, and second indicator means within said cup-shaped focusing member visible through and co-operating with markings on said scale carrier, said focusing member being provided with an arcuate camming slot at the bottom of its cup, said first coupling means including a pin on said lens barrel axially guided on said housing and passing through said slot for camming displacement by said focusing member, said pin engaging said markings for maintaining same in a reference position.

2. A camera objective comprising a generally cylindrical housing, a lens barrel axially displaceable in said housing, a cup-shaped focusing member coupled with said lens barrel for axially displacing same, said focusing member being rotatable on said housing about an axis extending generally radially thereof, a light-transmissive cover spanning the rim of said cup-shaped focus-member, an indicator member within said cup-shaped focusing member, said cover and said indicator member being provided with co-operating markings, the marking of said indicator member being visible through said cover, and retaining means for holding said indicator member in a reference position.

3. A camera objective according to claim 2 wherein said focusing member is provided at its bottom with an arcuate camming slot, said retaining means including a pin on said lens barrel axially guided within said housing and passing through said slot into engagement with said indicator member, said lens barrel being axially displaceable by camming engagement between said slot and said pin.

References Cited in the file of this patent

UNITED STATES PATENTS

| | | |
|---|---|---|
| 1,768,315 | Goldhammer | June 24, 1930 |
| 2,147,567 | Zapp | Feb. 14, 1939 |
| 2,273,555 | Barnhart | Feb. 17, 1942 |
| 2,334,075 | Davenport | Nov. 9, 1943 |
| 2,414,083 | Borden | Jan. 14, 1947 |
| 2,493,463 | Morgan et al. | Jan. 3, 1950 |
| 2,672,798 | Snyder | Mar. 23, 1954 |